(12) United States Patent
Zhang et al.

(10) Patent No.: US 12,442,731 B1
(45) Date of Patent: Oct. 14, 2025

(54) APPARATUS FOR EXTRACTING SOIL ORGANIC CARBON

(71) Applicant: NORTHWEST INSTITUTE OF ECO-ENVIRONMENT AND RESOURCES, CAS, Lanzhou (CN)

(72) Inventors: Caixia Zhang, Lanzhou (CN); Zhongping Li, Lanzhou (CN); Zongsheng Li, Lanzhou (CN); Xiaobo Wang, Lanzhou (CN); Ningjing Tan, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 19/251,302

(22) Filed: Jun. 26, 2025

(30) Foreign Application Priority Data

Jul. 11, 2024 (CN) .......................... 202410927125.2

(51) Int. Cl.
  *G01N 1/28* (2006.01)
  *G01N 33/24* (2006.01)

(52) U.S. Cl.
  CPC ........... *G01N 1/286* (2013.01); *G01N 33/241* (2013.01); *G01N 2001/2866* (2013.01)

(58) Field of Classification Search
  CPC ............................. G01N 1/286; G01N 33/24
  See application file for complete search history.

(56) References Cited

U.S. PATENT DOCUMENTS

| | | | |
|---|---|---|---|
| 4,192,176 A * | 3/1980 | Barringer ............. | G01N 1/2211 73/865.5 |
| 9,962,717 B1 | 5/2018 | Micic | |
| 12,013,386 B1 * | 6/2024 | Ying ........................ | G01N 1/34 |
| 12,247,903 B2 * | 3/2025 | Vo .......................... | G01N 1/286 |
| 12,332,156 B2 * | 6/2025 | Zhang ...................... | G01N 1/38 |
| 2015/0068806 A1 * | 3/2015 | Duran Toro ............ | E21B 49/02 175/50 |
| 2023/0213545 A1 * | 7/2023 | Cotrufo ............. | G01N 35/1004 73/863.24 |

FOREIGN PATENT DOCUMENTS

| | | | |
|---|---|---|---|
| CN | 212674588 U | * | 3/2021 |
| CN | 214131407 U | | 9/2021 |
| CN | 117367925 A | | 1/2024 |
| CN | 220380843 U | | 1/2024 |
| CN | 118130703 A | | 6/2024 |

* cited by examiner

*Primary Examiner* — John Fitzgerald (57) ABSTRACT

An apparatus for extracting soil organic carbon, including a rotary shaker, a first driver, a grinding and sieving device and a second driver. The rotary shaker includes a first support base, a first motor, a first support ring, a first rotating element, a heater, a weighing component and a centrifuge tube. The first driver is connected to the first rotating element to drive the first rotating element to rotate with respect to the first support ring. The grinding and sieving device includes a second support base, a second motor, a second support ring, a second rotating element, and a grinding sieve tube. The second driver is connected to the second rotating element to drive the second rotating element to rotate with respect to the second support ring.

9 Claims, 7 Drawing Sheets

APPARATUS FOR EXTRACTING SOIL ORGANIC CARBON

CROSS-REFERENCE TO RELATED APPLICATIONS

This application claims the benefit of priority from Chinese Patent Application No. 202410927125.2, filed on Jul. 11, 2024. The content of the aforementioned application, including any intervening amendments made thereto, is incorporated herein by reference in its entirety.

TECHNICAL FIELD

This application relates to soil detection, and more particularly to an apparatus for extracting soil organic carbon.

BACKGROUND

Soil constitutes the largest carbon reservoir in terrestrial ecosystems, which is dominated by soil organic carbon (SOC). In recent years, under the combined influence of anthropogenic factors and climatic change, the SOC pool has become the most dynamically changing carbon reservoir. Numerous natural processes simultaneously involve the $CO_2$ absorption and $CO_2$ release, and thus whether a system functions as a carbon sink (absorption exceeds emission) or a carbon source (emission exceeds absorption) is determined by the difference between the $CO_2$ absorption and $CO_2$ emission. Soil carbon sequestration refers to the process in which crops absorb atmospheric $CO_2$ through photosynthesis and store it within the soil carbon pool in the form organic matter, thereby reducing the atmospheric greenhouse gas level. At the same time, this carbon sequestration mechanism can also increase the soil organic matter content and improve the soil fertility. The dynamical change of SOC primarily involve: conversion into $CO_2$ by mineralization and conversion into more stable fractions by humification. During the SOC mineralization, the biodegradable faction, also named mineralizable carbon, biodegradable carbon and the physio-ecological index, serves as a critical indicator reflecting the level of carbon susceptible to mineralization in the soil. This parameter functionally links multiple factors including fertility level, environmental stress, cultivation duration and sustainability. The mineralizable carbon exhibits distinct microbial correlations: lower values indicate activity of indigenous microbial communities under steady-state conditions, while higher values reflect the activity of fermentative microbial flora. This parameter serves as a comprehensive indicator of soil microbial activity, quantitatively representing both the $CO_2$ production per unit of microbial biomass during the organic matter decomposition and the overall microbial degradation efficiency of the soil organic matter. Given the strong correlation between soil mineralization and decomposition processes, the quantity and intensity of $CO_2$ released from the organic carbon mineralization can be used to evaluate the influence of environmental factors and land-use change on the SOC decomposition, as well as the soil microbial activity. The mineralizable carbon content can be precisely determined by measuring the $CO_2$ emission from the microbial decomposition of the organic matter. Consequently, accurate SOC determination is necessary for researches about terrestrial carbon cycling and carbon emission mechanisms.

However, the existing SOC extraction and determination methods generally involve manual operation, which results in high labor intensity, low efficiency, and significant measurement errors.

SUMMARY

An object of the disclosure is to provide an apparatus for extracting soil organic carbon, which is capable of improving the degree of automation, reducing labor intensity, and enhancing detection efficiency and accuracy.

Technical solutions of the present disclosure are described as follows.

An apparatus for extracting soil organic carbon, comprising:
- a rotary shaker;
- a first driver;
- a grinding and sieving device; and
- a second driver;

wherein the rotary shaker comprises a first support base, a first motor, a first support ring, a first rotating element, a heater, a weighing component and a centrifuge tube; the first motor is mounted to the first support base; an output shaft of the first motor is connected to the first support ring; the first rotating element is rotatably engaged with the first support ring; the heater, the weighing component and the centrifuge tube are provided on the first rotating element; and the heater is configured to heat the centrifuge tube; and the weighing component is configured to bear the centrifuge tube;

the first driver is connected to the first rotating element to drive the first rotating element to rotate with respect to the first support ring; the first motor is configured to adjust a condition of the first rotating element, such that an opening of the centrifuge tube faces upward to allow material loading; and the first motor is configured to drive the first rotating element to rotate with respect to the first support base to allow material mixing;

the grinding and sieving device comprises a second support base, a second motor, a second support ring, a second rotating element and a grinding sieve tube;

the second motor is mounted to the second support base; the second support ring is mounted on an output shaft of the second motor; the second rotating element is rotatably engaged with the second support ring; the grinding sieve tube is mounted to the second rotating element; the second motor is configured to adjust a position of the second rotating element, such that the second rotating element is engaged with the second driver; and the second driver is connected to the second rotating element to drive the second rotating element to rotate with respect to the second support ring, so as to perform grinding;

the rotary shaker further comprises a first telescopic part, a first mounting plate, a suction tube, a second telescopic part, a second mounting plate and a delivery tube;

the first telescopic part is mounted to the first support base; the first mounting plate is connected to the first support base; the first telescopic part is configured to drive the first mounting plate to reciprocate in a first direction; the suction tube is mounted to the first mounting plate; and a first end of the suction tube is configured to be inserted into or separated from the centrifuge tube; and the second telescopic part is mounted to the first support base; the second mounting plate is mounted to the second telescopic part; the second telescopic part is configured to drive the second mounting plate to reciprocate in a second direction that forms an angle with the first direction; the delivery tube is mounted to the second mounting plate; and a first end of the delivery tube is configured to be connected to or separated from a second end of the suction tube, and a second end of the delivery tube is connected to a material source.

Based on the above solution, when it is necessary to add hydrochloric acid solution or distilled water into the centrifuge tube, the second end of the delivery tube is connected to the material source. The first telescopic part and the second telescopic part are then operated, such that the first telescopic part drives the first mounting plate to move toward the first rotating element, causing the first end of the suction tube mounted on the first mounting plate to be inserted into the centrifuge tube through the opening of the centrifuge tube. Simultaneously, the second telescopic part drives the second mounting plate to move upward toward the suction tube until the first end of the delivery tube mounted on the second mounting plate mates with the second end of the suction tube. The suction tube utilizes suction force to draw the material from the material source into the centrifuge tube, thereby enabling quantitative addition of hydrochloric acid solution or distilled water. When the delivery tube is connected to the material source, a hose is installed at the second end of the delivery tube. An end of the hose is communicated with the material source. The delivery of material into the centrifuge tube is achieved through the cooperation between the delivery tube and the suction tube. The delivery tube and the suction tube operate independently with simple motion mechanisms. During the movement of the delivery tube, the hose is driven to move along with it. Since the movement of the delivery tube is straightforward, the hose is less likely to become entangled, ensuring safety and reliability during operation. In actual operation, the numbers of the centrifuge tube, the suction tube, and the delivery tube are set to be the same, and typically a plurality of each is provided. Each delivery tube is configured to cooperate with a corresponding hose. Although the number of hoses is large, the second mounting plate drives the movement of the multiple hoses in a simple manner, and the space required for their movement is small, making the system easy to operate.

In some embodiments, the first mounting plate is provided with a vacuum channel; the suction tube is communicated with the vacuum channel; and the vacuum channel is communicated with a vacuum pump.

Based on the above solution, when material delivery is required, the vacuum pump is activated to create a negative pressure in an inner chamber of the suction tube through the vacuum channel. With the negative pressure, the material is drawn from the delivery tube into the suction tube and then into the centrifuge tube. This configuration enables convenient material delivery, and the amount of material can be quantitatively controlled by adjusting the operating time of the vacuum pump.

In some embodiments, the opening of the centrifuge tube is provided with an elastic cover; the elastic cover is provided with a positioning hole configured to allow the first end of the suction tube to pass through; and the positioning hole is closable under the action of an elastic restoring force.

Based on the above configuration, when material needs to be delivered, the first end of the suction tube is inserted into the positioning hole of the elastic cover. Due to the deformability of the elastic cover, a wall of the positioning hole can tightly conform to an outer surface of the suction tube, thereby forming a seal, which facilitates the generation of negative pressure within the suction tube for delivering the material into the centrifuge tube.

In some embodiments, the second end of the suction tube is provided with a first sealing ring; the first end of the delivery tube is provided with a second sealing ring; and the first sealing ring is configured to be sealedly engaged with the second sealing ring.

Based on the above solution, both the first sealing ring and the second sealing ring can be configured as rubber rings. When the first sealing ring is joined with the second sealing ring, an elastic deformation occurs to achieve a sealing engagement, thereby providing good sealing performance and facilitating material delivery.

In some embodiments, the first rotating element is provided with a connecting gear; the first driver comprises a third motor and a driving gear; the driving gear is mounted on an output shaft of the third motor; and the connecting gear is configured to engage with or disengage from the driving gear.

Based on the foregoing configuration, when the material in the centrifuge tube needs to undergo centrifugation, the first rotating element is rotated to a position where the connecting gear engages with the driving gear. Meanwhile, the suction tube is withdrawn from the centrifuge tube to prevent interference between the suction tube and the centrifuge tube. The first motor is then activated to drive the first rotating element to rotate with respect to the first support ring, thereby performing a centrifugation operation on the mixed material in the centrifuge tube.

In some embodiments, the rotary shaker further comprises a third motor; the first support base is mounted on an output shaft of the third motor; and the third motor is configured to drive the first support base to rotate.

Based on the foregoing configuration, the cooperation between the first motor and the third motor enables the first rotating element to move in multiple directions. The complex motion of the first rotating element facilitates thorough stirring and mixing of the material in the centrifuge tube, thereby improving the mixing efficiency.

In some embodiments, the grinding sieve tube comprises a grinding tube body, a grinding ball, a sieve, and a receiving tube body; the grinding tube body and the receiving tube body are both mounted on the second rotating element; the grinding ball and the sieve are arranged within the grinding tube body; and the receiving tube body is configured to receive materials falling from the sieve inside the grinding tube body.

Based on the foregoing configuration, after the material in the centrifuge tube has been processed, the centrifuge tube is communicated with the grinding tube body via the suction tube, allowing the material in the centrifuge tube to be transferred into the grinding tube body through the suction tube. In other words, the structure configured to add material into the centrifuge tube using the suction tube and the delivery tube is also capable of subsequently transferring the processed material from the centrifuge tube to the grinding sieve tube, thereby achieving a high degree of automation. Once the material enters the grinding tube body, the second motor is activated to drive the second rotating element to rotate with respect to the second support base, such that the grinding ball inside the grinding tube body collides with the material, thereby performing initial grinding. During the grinding process, a particle size of the material is reduced. Once the desired particle size is reached, the material passes through the sieve into the receiving tube body. Subsequently, a position of the second rotating element with respect to the second driver is adjusted, and the second driver continues to drive the second rotating element to rotate around the second support ring, thereby performing further grinding and improving the grinding efficiency.

In some embodiments, a side of the second rotating element close to an opening of the grinding sieve tube is provided with a flange extending outward; the second driver comprises a third motor and a clamp; the clamp is mounted on an output shaft of the third motor; and the clamp is configured to grip or release the flange.

Based on the foregoing configuration, the flange is gripped by the clamp, facilitating engagement between the second rotating element and the second driver. During the rotation of the second rotating element, its position is maintained by the second support ring, resulting in minimal wobbling, reduced component wear, extended service life, low operational noise and an improved working environment.

In some embodiments, the grinding and sieving device further comprises a third motor; the second support base is mounted on an output shaft of the third motor; and the third motor is configured to drive the second support base to rotate.

Based on the above solution, the second rotating element is driven by cooperation of the second motor and the third motor, resulting in more complex movement of the second rotating element. This facilitates preliminary grinding and allows adjustment of the position of the second rotating element to enable engagement with the second driver.

Compared to the prior art, the present disclosure has the following beneficial effects.

Regarding the soil organic carbon extracting apparatus provided herein including a rotary shaker, a first driver, a grinding and sieving device and a second driver, the operations involved in the soil sample processing, such as centrifugal mixing, thermal evaporation, and grinding and sieving, can be simulated, thereby enabling the automated, efficient, and labor-saving and time-saving soil sample treatment.

During operation, the first motor adjusts the state of the first rotating element to make the opening of the centrifuge tube face upwards, thereby allowing the material loading into the centrifuge tube. After that, the first motor drives the first rotating element to rotate with respect to the first base to complete material mixing. After the mixing step, the first rotating element is engaged with the first driver, and is driven by the first driver to rotate with respect to the first support ring, so as to centrifuge the mixed material in the centrifuge tube. After centrifugation, the supernatant in the centrifuge tube is pipetted, during which distilled water can be repeatedly added into the centrifuge tube. After the supernatant is removed, the centrifuge tube is heated by the heater to allow the moisture inside the mixed material to evaporate. A weight of the centrifuge tube as well as a total weight of the centrifuge tube and the mixed material therein can be measured by the weighing component. The collected weight data can be transmitted to a host for storage, and can also be displayed directly on a display, facilitating the data acquisition and visualization. After the moisture in the mixed material is completely removed, the centrifuge tube is engaged with the grinding sieve tube, and the processed material mixture is transferred to the grinding sieve tube. The position of the second rotating element is adjusted by the second motor to be engaged with the second driver, and the second rotating element is driven by the second motor to rotate with respect to the second support ring, thereby performing grinding. After the grinding operation is complete, the soil residue is removed.

BRIEF DESCRIPTION OF THE DRAWINGS

In order to illustrate the technical solutions in the present disclosure more clearly, the accompanying drawings needed in the description of the embodiments will be briefly described below. It is evident that presented in the following accompanying drawings are only some embodiments of the present disclosure, instead of all embodiments. For those of ordinary skill in the art, other accompanying drawings can be obtained based on these accompanying drawings without making creative effort.

In the figures: 001—base; 100—rotary shaker; 110—first support base; 120—first motor; 130—first support ring; 140—first rotating element; 141—connecting gear; 150—heater; 160—weighing component; 170—centrifuge tube; 171—elastic cover; 180—first telescopic part; 190—first mounting plate; 191—suction tube; 192—second telescopic part; 193—second mounting plate; 194—delivery tube; 195—fourth motor; 200—first driver; 210—third motor; 220—driving gear; 300—grinding and sieving device; 310—second support base; 320—second motor; 330—second support ring; 340—second rotating element; 341—flange; 350—grinding sieve tube; 351—grinding tube body; 352—grinding ball; 353—sieve; 354—receiving tube body; 360—sixth motor; 400—second driver; 410—fifth motor; and 420—clamp.

DETAILED DESCRIPTION OF EMBODIMENTS

In order to make the objects, technical solutions and advantages of the present disclosure clearer, the present disclosure will be described clearly and completely below in conjunction with the accompanying drawings and embodiments. Obviously, described herein are merely some embodiments of the present disclosure, rather than all embodiments. The components of embodiments of the present disclosure described and shown in the accompanying drawings may be arranged and designed in a variety of different configurations.

Thus, the following detailed description is merely illustrative of selected embodiments of the present disclosure in the accompanying drawings, is not intended to limit the scope of the present disclosure. Based on the embodiments in the present disclosure, all other embodiments obtained by those of ordinary skill in the art without making creative effort shall fall within the scope of the present disclosure defined by the appended claims.

It should be noted that similar reference numerals and letters in the following accompanying drawings indicate similar items. Therefore, once an item is defined in one accompanying drawing, it does not require further definition or explanation in the subsequent accompanying drawings.

Additionally, in the description of the present disclosure, it should be noted that, as used herein, terms "center", "up", "down", "left", "right", "vertical", "horizontal", "inner" and "outer" are based on the those shown in the accompanying drawings. These terms are solely for the convenience of describing the present disclosure, and are not intended to indicate or imply that the devices or components must have specific orientations or be constructed and operated in specific orientations. Therefore, these terms should not be understood as limitations of the present disclosure. Furthermore, as used herein, terms "first", "second" and "third" are merely used to distinguish technical features, rather than indicating or implying their relative importance.

In addition, the terms "horizontal" and "vertical" do not require that the components be absolutely horizontal or vertical. Rather, such terms merely indicate a relative orientation. For example, "horizontal" simply means more horizontal relative to "vertical" and does not require a structure to be perfectly horizontal; slight inclinations are permissible.

In the description of the present disclosure, it should also be noted that, unless otherwise specifically defined, as used herein, terms "arranged", "mounted", "connected" and "coupled" are to be broadly understood. For example, these terms may refer to fixed connections, detachable connections, or integral connections; mechanical connections, electrical connections, direct connections or indirect connections through intermediate media; or communication between two components internally. For those of ordinary skill in the art, the specific meaning of these terms in the present disclosure can be understood based on the particular context.

In the prior art, the determination of soil carbon content is typically dependent on manual operations, which results in high labor intensity, low efficiency, significant human error, and poor detection accuracy, thereby hindering the effective analysis and utilization of environmental soil.

In view of this, the present disclosure provides an apparatus for extracting soil organic carbon, which features a high degree of automation, improved operational efficiency, minimal manual intervention, reduced error, and enhanced extraction accuracy.

As shown in FIGS. 1-7, in this embodiment, an apparatus for extracting soil organic carbon includes a rotary shaker 100, a first driver 200, a grinding and sieving device 300, and a second driver 400. The rotary shaker 100 includes a first support base 110, a first motor 120, a first support ring 130, a first rotating element 140, a heater 150, a weighing component 160, and a centrifuge tube 170. The first motor 120 is mounted to the first support base 110. An output shaft of the first motor 120 is connected to the first support ring 130. The first rotating element 140 is rotatably engaged with the first support ring 130. The heater 150, the weighing component 160, and the centrifuge tube 170 are provided on the first rotating element 140. The heater 150 is configured to heat the centrifuge tube 170. The weighing component 160 is configured to bear the centrifuge tube 170. The first driver 200 is connected to the first rotating element 140 to drive the first rotating element 140 to rotate with respect to the first support ring 130. The grinding and sieving device 300 includes a second support base 310, a second motor 320, a second support ring 330, a second rotating element 340, and a grinding sieve tube 350. The second motor 320 is mounted to the second support base 310. The second support ring 330 is mounted on an output shaft of the second motor 320. The second rotating element 340 is rotatably engaged with the second support ring 330. The grinding sieve tube 350 is mounted to the second rotating element 340. The second driver 400 is connected to the second rotating element 340 to drive the second rotating element 340 to rotate with respect to the second support ring 330.

According to the foregoing, the apparatus for extracting soil organic carbon provided herein operates in the following manner.

First, the first motor 120 adjusts the state of the first rotating element 140 to make the opening of the centrifuge tube 170 face upwards, thereby allowing the material loading into the centrifuge tube 170. After that, the first motor 120 drives the first rotating element 140 to rotate with respect to the first base 110 to complete material mixing. After the mixing step, the first rotating element 140 is engaged with the first driver 200, and is driven by the first driver 200 to rotate with respect to the first support ring 130, so as to centrifuge the mixed material in the centrifuge tube 170. After centrifugation, the supernatant in the centrifuge tube 170 is pipetted, during which distilled water can be repeatedly added into the centrifuge tube 170. After the supernatant is removed, the centrifuge tube is heated by the heater 150 to allow the moisture inside the mixed material to evaporate. A weight of the centrifuge tube 170 as well as a total weight of the centrifuge tube 170 and the mixed material therein can be measured by the weighing component 160. The collected weight data can be transmitted to a host for storage, and can also be displayed directly on a display, facilitating the data acquisition and visualization. After the moisture in the mixed material is completely removed, the centrifuge tube 170 is engaged with the grinding sieve tube 350, and the processed material mixture is transferred to the grinding sieve tube 350. The position of the second rotating element 340 is adjusted by the second motor 320 to be engaged with the second driver 400, and the second rotating element 340 is driven by the second motor 320 to rotate with respect to the second support ring 330, thereby performing grinding. After the grinding operation is completed, the soil residue is removed.

It should be noted that the number of the centrifuge tube 170 may be set as needed and may provide in plurality. In this embodiment, the specific number is not particularly limited. The number of the grinding sieve tube 350 corresponds to that of the centrifuge tube 170, with a one-to-one correspondence established therebetween. This configuration improves the extraction efficiency.

By way of example, the following embodiments provide a detailed description of the apparatus for extracting soil organic carbon as disclosed herein.

Figure 1:
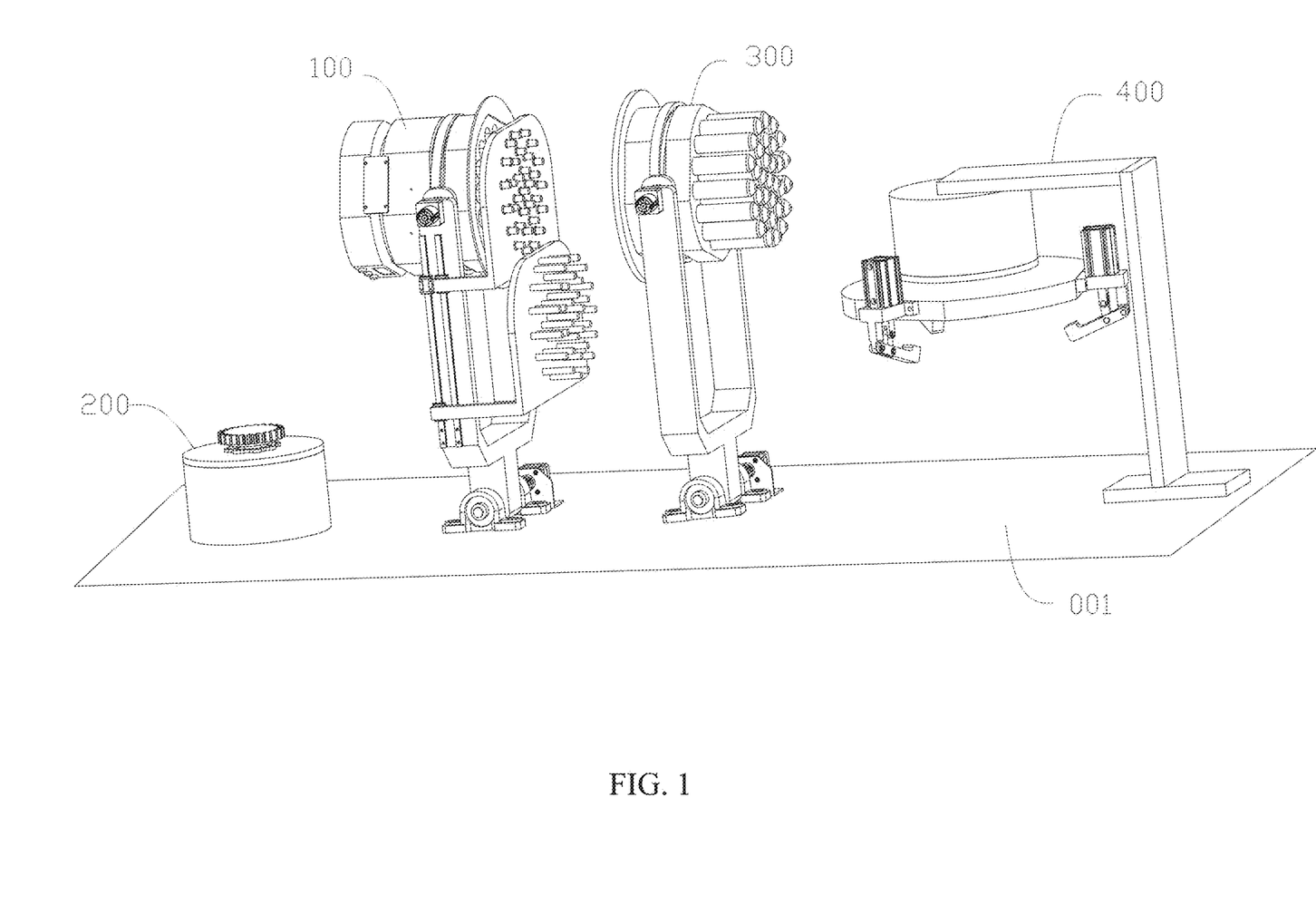
FIG. 1 schematically shows an apparatus for extracting soil organic carbon according to an embodiment of the present disclosure.
Figure 2:
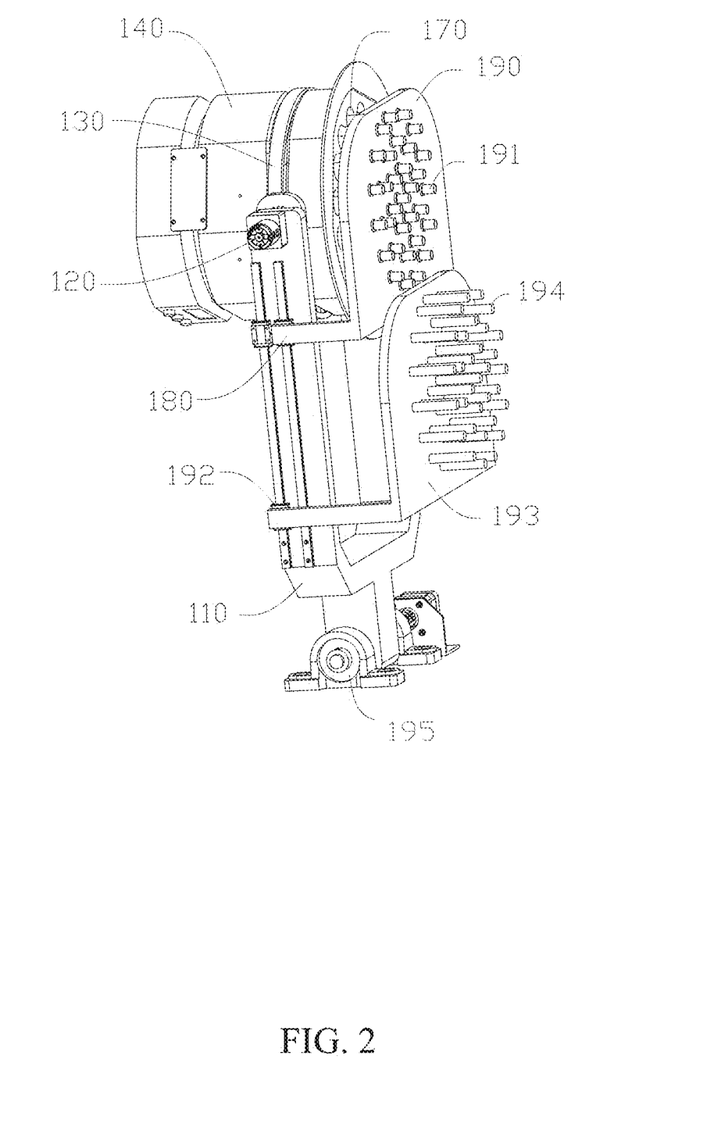
FIG. 2 schematically shows a rotary shaker according to an embodiment of the present disclosure.
Figure 3:
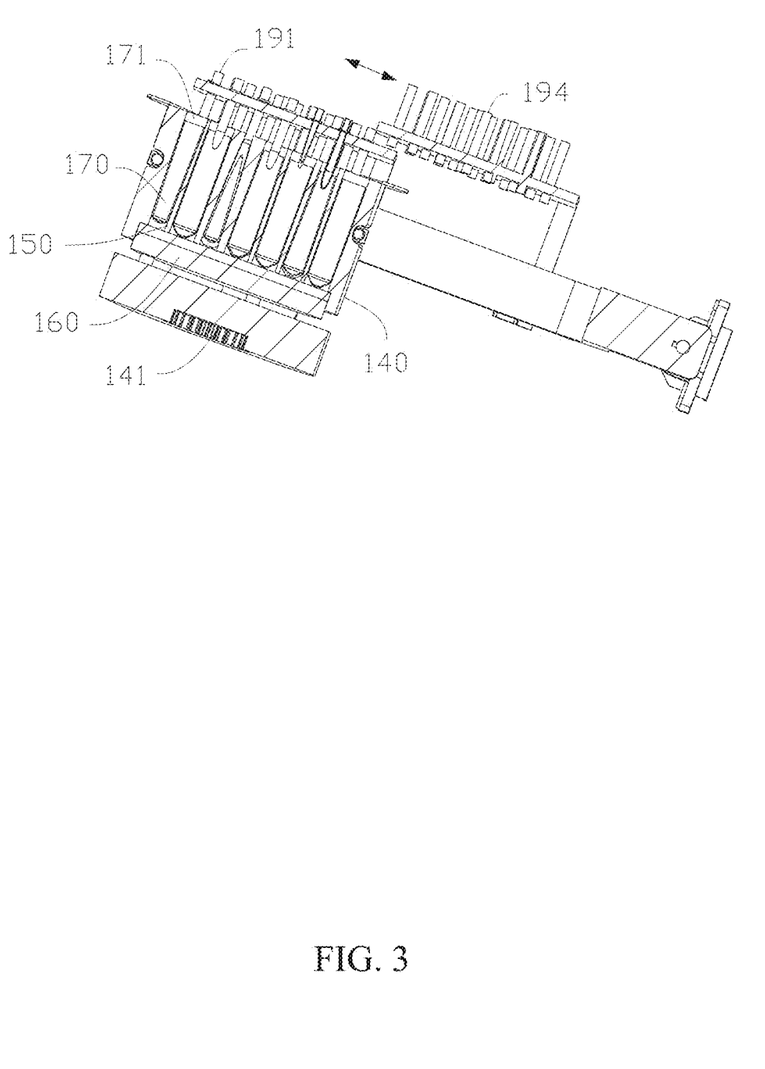
FIG. 3 is a cross-sectional view of the rotary shaker according to an embodiment of the present disclosure.

Referring to FIGS. 1-3, in this embodiment, the rotary shaker 100 further includes a first telescopic part 180, a first mounting plate 190, a suction tube 191, a second telescopic part 192, a second mounting plate 193, and a delivery tube 194. The first telescopic part 180 is mounted to the first support base 110. The first mounting plate 190 is connected to the first support base 110. The first telescopic part 180 is configured to drive the first mounting plate 190 to reciprocate in a first direction. For example, a sliding direction of the first mounting plate 190 driven by the first telescopic part 180 is perpendicular to an axis of the first motor 120. The suction tube 191 is mounted to the first mounting plate 190. A first end of the suction tube 191 is configured to be inserted into or separated from the centrifuge tube 170. The number of the suction tube 191 corresponds to the number of the centrifuge tube 170 in a one-to-one manner. The second telescopic part 192 is mounted to the first support base 110. The second mounting plate 193 is mounted to the second telescopic part 192. The second telescopic part 192 is configured to drive the second mounting plate 193 to reciprocate in a second direction that forms an angle with the first direction (that is, the first direction is not parallel to the second direction). For example, in this embodiment, the first direction is perpendicular to the second direction. In an embodiment, the first direction indicates the left-right direction, and the second direction indicates the top-bottom direction. The delivery tube 194 is mounted to the second mounting plate 193. A first end of the delivery tube 194 is configured to be connected to or separated from a second end of the suction tube 191, and a second end of the delivery tube 194 is connected to a material source. The number of the delivery tube 194 corresponds to the number of the suction tube 191 in a one-to-one manner.

It should be understood that, when hydrochloric acid solution or distilled water is to be added to the centrifuge tube 170, the second end of the delivery tube 194 is connected to the material source. The first telescopic part 180 and the second telescopic part 192 are then operated, such that the first telescopic part 180 drives the first mounting plate 190 to move toward the first rotating element 140, causing the first end of the suction tube 191 mounted on the first mounting plate 190 to be inserted into the centrifuge tube 170 through the opening of the centrifuge tube 170. At the same time, the second telescopic part 192 drives the second mounting plate 193 to move upward to approach the suction tube 191 until the first end of the delivery tube 194 mounted on the second mounting plate 193 mates with the second end of the suction tube 191. The suction tube 191 uses suction force to draw the material from the material source into the centrifuge tube 170, thereby enabling quantitative addition of hydrochloric acid solution or distilled water. When the delivery tube 194 is connected to the material source, a hose is mounted to the second end of the delivery tube 194. An end of the hose is communicated with the material source. The delivery of the material to the centrifuge tube 170 is implemented through the cooperation between the delivery tube 194 and the suction tube 191. The delivery tube 194 and the suction tube 191 operate independently, and their movement mechanisms are simple. During the movement of the delivery tube 194, the hose is driven to move along with it. Since the movement of the delivery tube 194 is simple, the hose is not easily entangled, resulting in a safe and reliable operation. In actual operation, the numbers of the centrifuge tube 170, the suction tube 191, and the delivery tube 194 are set to be the same, and typically a plurality of each is provided. Each delivery tube 194 is configured to cooperate with a corresponding hose. Although the number of the hose is large, the second mounting plate 193 drives the movement of the multiple hoses in a simple manner. The space required for movement of the hoses is minimal, and operation is convenient.

It should be understood that, referring to FIG. 3 and taking the direction of the arrow as a reference, when the second mounting plate 193 moves obliquely toward the upper left, the left-side end of the delivery tube 194 can be connected to the right-side end of the suction tube 191.

In some embodiments, the first mounting plate 190 is provided with a vacuum channel. Each of a plurality of the suction tubes 191 is communicated with the vacuum channel. The vacuum channel is communicated with a vacuum pump. When material delivery is required, the vacuum pump is activated. The vacuum pump generates a negative pressure in an inner chamber of the suction tube 191 through the vacuum channel. With the negative pressure, the material is drawn from the delivery tube 194 and enters the centrifuge tube 170 via the suction tube 191. This configuration allows for convenient material delivery, and the amount of material can be quantitatively controlled by adjusting the operating time of the vacuum pump.

In addition, to facilitate the insertion of the suction tube 191 into the centrifuge tube 170, the first end of the suction tube 191 may be configured in a conical shape.

In this embodiment, the opening of the centrifuge tube 170 is provided with an elastic cover 171. The elastic cover 171 is provided with a positioning hole configured to allow the first end of the suction tube 191 to pass through. The positioning hole is closable under the action of an elastic restoring force. A plurality of elastic covers 171 for a plurality of centrifuge tubes 170 may be integrated together to enable synchronous removal and installation of the plurality of elastic covers 171, thereby improving operational efficiency. That is, when adding a soil sample, the elastic cover 171 can be opened to facilitate easier addition.

It should be understood that when it is necessary to deliver liquids such as hydrochloric acid solution or distilled water, the first end of the suction tube 191 is inserted into the positioning hole of the elastic cover 171. Due to the elastic cover 171 having a certain degree of deformability, a wall of the positioning hole can closely fit around the suction tube 191, thereby achieving a seal and facilitating the generation of negative pressure via the suction tube 191 to transfer the material into the centrifuge tube 170.

It should be understood that when adding a soil sample, the suction tube 191 may first be inserted into the positioning hole of the elastic cover 171, and then the soil sample may be introduced into the centrifuge tube 170 through the first end of the suction tube 191.

In this embodiment, the second end of the suction tube 191 is provided with a first sealing ring. The first end of the delivery tube 194 is provided with a second sealing ring. The first sealing ring is configured to be sealedly engaged with the second sealing ring. Both the first sealing ring and the second sealing ring may be implemented as rubber rings. When connected, the first sealing ring and the second sealing ring achieve a sealing fit through elastic deformation, providing good sealing performance and facilitating the delivery of material.

Figure 6:
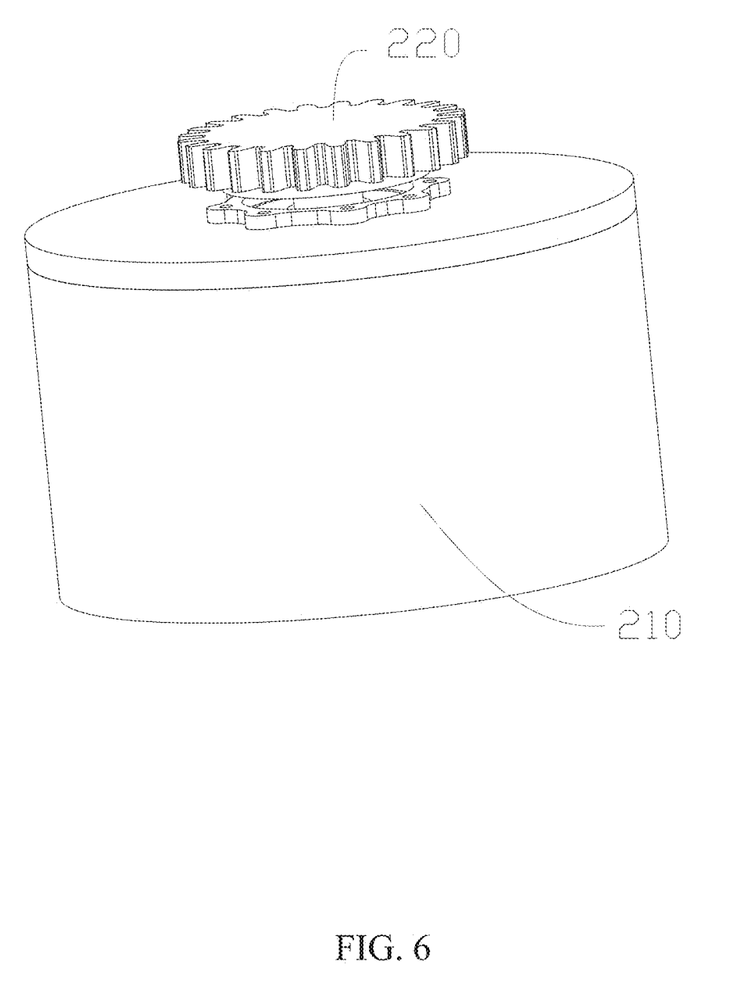
FIG. 6 schematically shows a first driver according to an embodiment of the present disclosure.

Referring to FIG. 6, in this embodiment, the first rotating element 140 is provided with a connecting gear 141. The connecting gear 141 is configured as an internal gear ring. The first driver 200 includes a third motor 210 and a driving gear 220. The driving gear 220 is mounted on an output shaft of the third motor 210. The connecting gear 141 is configured to engage with or disengage from the driving gear 220. When the material in the centrifuge tube 170 needs to undergo a centrifugation process, the first rotating element 140 is rotated to a position where the connecting gear 141 is engaged with the driving gear 220. Meanwhile, the suction tube 191 is withdrawn from the centrifuge tube 170 to prevent interference between the suction tube 191 and the centrifuge tube 170. The third motor 210 is then activated to drive the first rotating element 140 to rotate with respect to the first support ring 130, thereby performing centrifugation on the mixed material inside the centrifuge tube 170.

In this embodiment, the rotary shaker 100 further includes a fourth motor 195. The first support base 110 is mounted on an output shaft of the fourth motor 195. The fourth motor 195 is configured to drive the first support base 110 to rotate about an axis that forms an angle with the axis of the first motor 120. By cooperating the first motor 120 and the fourth motor 195, the first rotating element 140 can be moved in multiple directions. The complex motion of the first rotating element 140 enables thorough stirring and mixing of the material inside the centrifuge tube 170, thereby improving the mixing effect. Furthermore, the cooperation between the first motor 120 and the fourth motor 195 facilitates the adjustment of the position of the first rotating element 140 relative to the first driver 200, which promotes the engagement between the connecting gear 141 and the driving gear 220.

Figure 4:
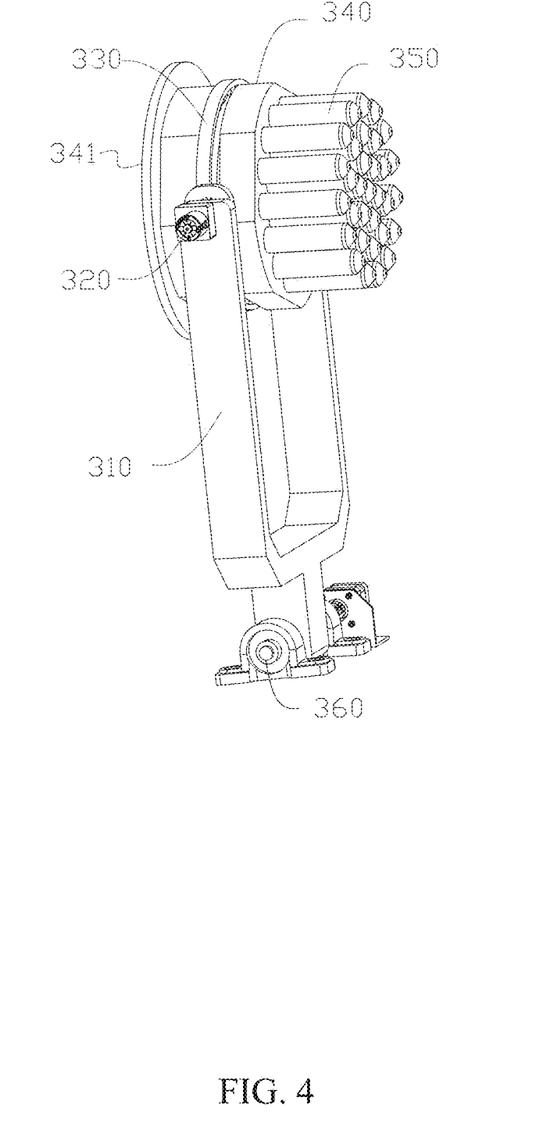
FIG. 4 schematically shows a grinding and sieving device according to an embodiment of the present disclosure.
Figure 5:
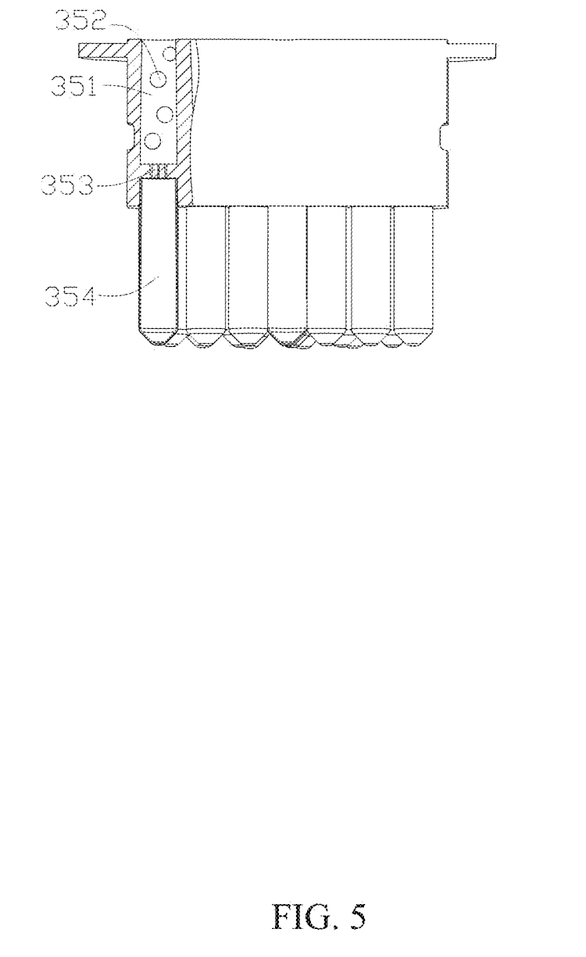
FIG. 5 is a partially sectional view of the grinding and sieving device according to an embodiment of the present disclosure.

Referring to FIGS. 4-5, in this embodiment, the grinding sieve tube 350 includes a grinding tube body 351, a grinding ball 352, a sieve 353, and a receiving tube body 354. The grinding tube body 351 and the receiving tube body 354 are both mounted on the second rotating element 340. The grinding ball 352 and the sieve 353 are both arranged within the grinding tube body 351. The receiving tube body 354 is configured to receive materials falling from the sieve 353 inside the grinding tube body 351. When the material in the centrifuge tube 170 has been processed, the centrifuge tube 170 is communicated with the grinding tube body 351 through the suction tube 191, such that the material in the centrifuge tube 170 can be delivered into the grinding tube body 351 via the suction tube 191. In other words, the configuration that uses the suction tube 191 and the delivery tube 194 for adding material to the centrifuge tube 170 also enables the subsequent transfer of the material from the centrifuge tube 170 to the grinding sieve tube 350, thereby providing a high level of automation. After the material enters the grinding tube body 351, the second motor 320 is activated to drive the second rotating element 340 to rotate with respect to the second support base 310. The grinding ball 352 in the grinding tube body 351 collides with the material to perform initial grinding. During the grinding process, the particle size of the material is reduced, and once it meets the requirements, the material passes through the sieve 353 into the receiving tube body 354. Subsequently, the position of the second rotating element 340 relative to the second driver 400 is adjusted, and the second driver 400 continues to drive the second rotating element 340 to rotate around the second support ring 330, thereby performing further grinding and improving the grinding effect.

Figure 7:
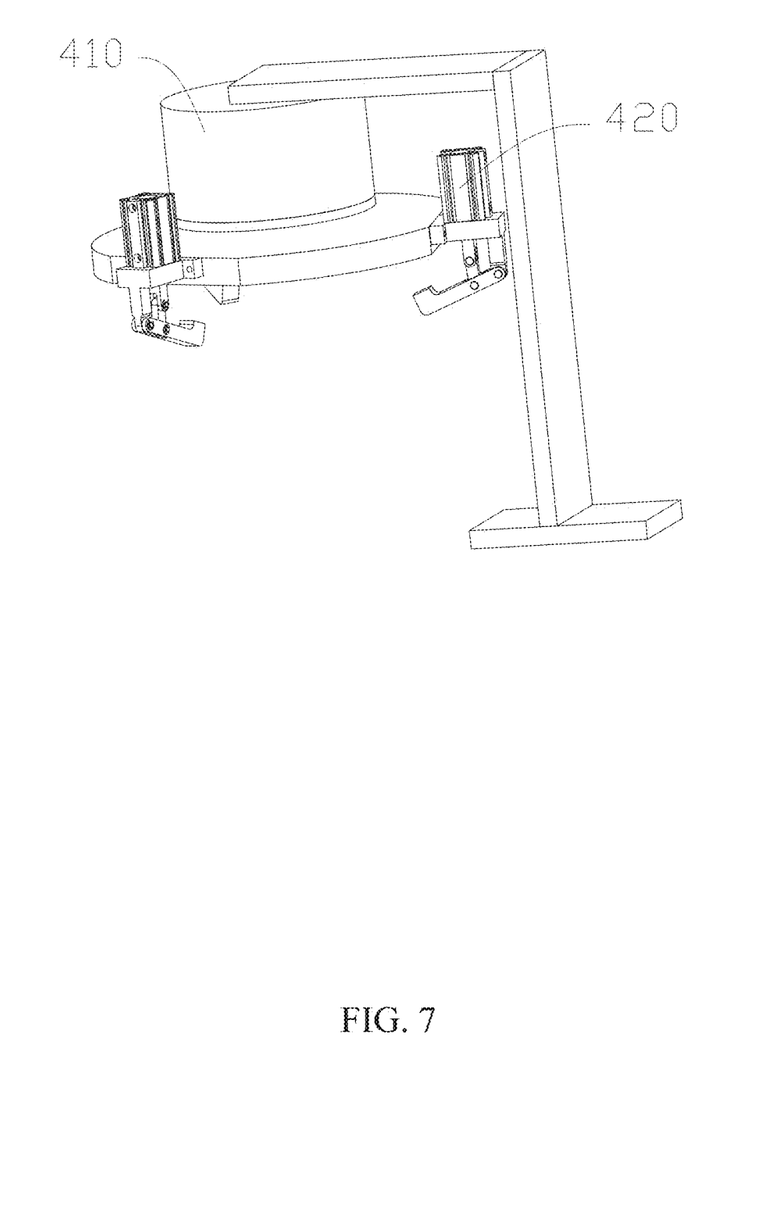
FIG. 7 schematically shows a second driver according to an embodiment of the present disclosure.

Referring to FIG. 7, in this embodiment, a side of the second rotating element 340 close to an opening of the grinding sieve tube 350 is provided with a flange 341 extending outward. The second driver 400 includes a fifth motor 410 and a clamp 420. The clamp 420 is mounted on an output shaft of the fifth motor 410, and is configured to grip or release the flange 341. The clamp 420 grips the flange 341, facilitating the engagement between the second rotating element 340 and the second driver 400. During the rotation of the second rotating element 340, the second support ring 330 provides positioning, resulting in minimal shaking, reduced wear of components, extended service life, low noise and a favorable working environment. It should be understood that the clamp 420 may be, but is not limited to, a cylinder.

In this embodiment, the grinding and sieving device 300 further includes a sixth motor 360. The second support base 310 is mounted on an output shaft of the sixth motor 360. The sixth motor 360 is configured to drive the second support base 310 to rotate about an axis that forms an angle with the axis of the second motor 320. The cooperation of the second motor 320 and the sixth motor 360 drives the movement of the second rotating element 340. The movement of the second rotating element 340 is more complex, which facilitates the initial grinding, and also facilitates the adjustment of the position of the second rotating element 340 through the cooperation of the second motor 320 and the sixth motor 360, such that the second rotating element 340 is engaged with the second driver 400.

In this embodiment, the heater 150 may be a heating sleeve mounted within the first rotating element 140. The heating sleeve is provided with a plurality of mounting holes. Each of the plurality of mounting holes is configured to position the centrifuge tube 170. In this manner, a contact area between the heater 150 and the centrifuge tube 170 is increased, thereby improving heating efficiency.

In some embodiments, the apparatus further includes a base 001. The fourth motor 195, the sixth motor 360, the first driver 200, and the second driver 400 are all mounted on the base 001. The first driver 200, the rotary shaker 100, the grinding and sieving device 300, and the second driver 400 are arranged in sequence.

The apparatus for extracting soil organic carbon provided in this embodiment features a high level of automation, low labor intensity, and high operational efficiency.

The embodiments described above are merely illustrative of the present disclosure, and are not intended to limit the scope of the present disclosure. It should be understood that various changes or substitutions made by those of ordinary skill in the art without departing from the spirit of the present disclosure shall fall within the scope of the present disclosure defined by the appended claims.

What is claimed is:

1. An apparatus for extracting soil organic carbon, comprising:
   a rotary shaker;
   a first driver;
   a grinding and sieving device; and
   a second driver;
   wherein the rotary shaker comprises a first support base, a first motor, a first support ring, a first rotating element, a heater, a weighing component and a centrifuge tube; the first motor is mounted to the first support base; an output shaft of the first motor is connected to the first support ring; the first rotating element is rotatably engaged with the first support ring; the heater, the weighing component and the centrifuge tube are provided on the first rotating element; and the heater is configured to heat the centrifuge tube; and the weighing component is configured to bear the centrifuge tube;
   the first driver is connected to the first rotating element to drive the first rotating element to rotate with respect to the first support ring; the first motor is configured to adjust a condition of the first rotating element, such that an opening of the centrifuge tube faces upward to allow material loading; and the first motor is configured to drive the first rotating element to rotate with respect to the first support base to allow material mixing;
   the grinding and sieving device comprises a second support base, a second motor, a second support ring, a second rotating element and a grinding sieve tube;
   the second motor is mounted to the second support base; the second support ring is mounted on an output shaft of the second motor; the second rotating element is rotatably engaged with the second support ring; the grinding sieve tube is mounted to the second rotating element; the second motor is configured to adjust a position of the second rotating element, such that the second rotating element is engaged with the second driver; and the second driver is connected to the second rotating element to drive the second rotating element to rotate with respect to the second support ring, so as to perform grinding;

the rotary shaker further comprises a first telescopic part, a first mounting plate, a suction tube, a second telescopic part, a second mounting plate and a delivery tube;

the first telescopic part is mounted to the first support base; the first mounting plate is connected to the first support base; the first telescopic part is configured to drive the first mounting plate to reciprocate in a first direction; the suction tube is mounted to the first mounting plate; and a first end of the suction tube is configured to be inserted into or separated from the centrifuge tube; and the second telescopic part is mounted to the first support base; the second mounting plate is mounted to the second telescopic part; the second telescopic part is configured to drive the second mounting plate to reciprocate in a second direction that forms an angle with the first direction; the delivery tube is mounted to the second mounting plate; and a first end of the delivery tube is configured to be connected to or separated from a second end of the suction tube, and a second end of the delivery tube is connected to a material source.

2. The apparatus according to claim 1, wherein the first mounting plate is provided with a vacuum channel; the suction tube is communicated with the vacuum channel; and the vacuum channel is communicated with a vacuum pump.

3. The apparatus according to claim 1, wherein the opening of the centrifuge tube is provided with an elastic cover; the elastic cover is provided with a positioning hole configured to allow the first end of the suction tube to pass through; and the positioning hole is closable under the action of an elastic restoring force.

4. The apparatus according to claim 1, wherein the second end of the suction tube is provided with a first sealing ring; the first end of the delivery tube is provided with a second sealing ring; and the first sealing ring is configured to be sealedly engaged with the second sealing ring.

5. The apparatus according to claim 1, wherein the first rotating element is provided with a connecting gear; the first driver comprises a third motor and a driving gear; the driving gear is mounted on an output shaft of the third motor; and the connecting gear is configured to engage with or disengage from the driving gear.

6. The apparatus according to claim 1, wherein the rotary shaker further comprises a third motor; the first support base is mounted on an output shaft of the third motor; and the third motor is configured to drive the first support base to rotate.

7. The apparatus according to claim 1, wherein the grinding sieve tube comprises a grinding tube body, a grinding ball, a sieve and a receiving tube body; the grinding tube body and the receiving tube body are both mounted on the second rotating element; the grinding ball and the sieve are arranged within the grinding tube body; and the receiving tube body is configured to receive materials falling from the sieve inside the grinding tube body.

8. The apparatus according to claim 1, wherein a side of the second rotating element close to an opening of the grinding sieve tube is provided with a flange extending outward; the second driver comprises a third motor and a clamp; the clamp is mounted on an output shaft of the third motor; and the clamp is configured to grip or release the flange.

9. The apparatus according to claim 1, wherein the grinding and sieving device further comprises a third motor; the second support base is mounted on an output shaft of the third motor; and the third motor is configured to drive the second support base to rotate.

* * * * *